United States Patent [19]

Pessina et al.

[11] Patent Number: 4,750,132
[45] Date of Patent: Jun. 7, 1988

[54] AUTOMATIC SIGNATURE PACK TRANSFER APPARATUS

[76] Inventors: Giorgio Pessina; Aldo Perobelli, both of Via Timavo, 32, 20037 Paderno Dugnano (Milano), Italy

[21] Appl. No.: 906,255

[22] Filed: Sep. 11, 1986

[30] Foreign Application Priority Data

Sep. 19, 1985 [IT] Italy .................. 22201 A/85
May 2, 1986 [IT] Italy .................. 20288 A/86

[51] Int. Cl.$^4$ .......................................... B65G 57/00
[52] U.S. Cl. ...................... 364/478; 212/205; 414/751; 901/16; 901/39
[58] Field of Search ............ 364/478; 212/205, 209, 212/214, 216, 217, 221; 414/71, 81, 83, 589, 590, 591, 662, 730, 732, 744 A, 749, 750, 751, 753; 901/16, 31, 39

[56] References Cited

U.S. PATENT DOCUMENTS

| | | | |
|---|---|---|---|
| 2,822,094 | 2/1958 | Greer | 901/16 |
| 3,527,268 | 9/1970 | Gunsburgh | 901/16 |
| 3,884,363 | 5/1975 | Ajlouny | 364/478 |
| 3,973,683 | 8/1976 | Keller | 212/217 |
| 4,032,022 | 6/1977 | Smith | 414/591 |
| 4,279,560 | 7/1981 | Ito et al. | 414/591 |
| 4,321,679 | 3/1982 | Fujie et al. | 364/478 |
| 4,547,115 | 10/1985 | Charbonnet | 414/589 |
| 4,566,836 | 1/1986 | Berger et al. | 901/16 |
| 4,571,149 | 2/1986 | Soroka et al. | 901/16 |
| 4,596,509 | 6/1986 | Ise et al. | 414/749 |
| 4,600,358 | 7/1986 | Graf | 414/749 |
| 4,648,233 | 3/1987 | Holland | 414/71 |
| 4,684,312 | 8/1987 | Antoszewski et al. | 414/751 |

*Primary Examiner*—Jerry Smith
*Assistant Examiner*—Allen MacDonald
*Attorney, Agent, or Firm*—Bucknam and Archer

[57] ABSTRACT

Apparatus for automatically picking up and positioning packs of individual signatures comprises a rigid framework which defines a bridge crane including a pair of parallel fixed support rails for guidance of a pair of movable rails on which is slidably supported a transfer head assembly including a jaw assembly having two jaws which can be moved towards or away from one another to pick up or release packs of signatures. The jaw assembly is movable up or down with respect to that part of the transfer head assembly mounted on the rails of the bridge crane, and is automatically controlled by a microprocessor to pick up a pack of signatures from a stack on a pallet, transport the pack to a treatment station, rotate it about a vertical axis to orientate it correctly before lowering, release it and then move to another stack to load a different treatment station.

6 Claims, 10 Drawing Sheets

AUTOMATIC SIGNATURE PACK TRANSFER APPARATUS

BACKGROUND OF THE INVENTION

One requirement the need for which is currently felt very strongly in printing and packaging installations is that of transferring packs of printed sheets or "signatures" between a storage station where the packs are generally carried on pallets, and a working station for the further treatment of the signatures, in particular for wrapping them. The packs of signatures in question generally include a large number of signatures, and these packs frequently have considerable dimensions and great weight. Their positioning is at present usually effected manually, which slows down the rate at which the subsequent processes can be performed to that at which the packs can be transferred by hand, and, moreover, leads to increased costs due to the necessary manual labour.

OBJECTS OF THE INVENTION

A primary object of the present invention is to provide apparatus for the automatic transfer of packs of individual signatures from a storage station where they may be stored on pallets, to a working station, which apparatus is capable of automatically transferring the packs of signatures in an extremely precise, rapid and reliable manner with a minimum intervention of manual labour.

Another object of the invention is to provide apparatus for the transfer of packs of individual signatures between a storage station and a plurality of treatment stations for the packs of signatures, in such a way as to obtain an extremely high productivity.

A further object of the present invention is to provide apparatus as above having electronic control means, preferably microprocessor control means, operable to co-ordinate all the operating movements made by the apparatus to transfer packs of signatures from a storage station to individual treatment stations in an extremely precise manner and in such a way that no manual intervention is required once the packs of signatures have been placed at the storage station.

Another object of the present invention is to provide apparatus for the transfer of signature packs which is able to pick up and transfer individual packs of signatures even if they are in very different orientations to start with.

Still a further object of the present invention is to provide apparatus for the automatic transfer of individual packs of signatures from a storage station on pallets to one or more working stations, which can be made starting from components and materials which are all readily available on the market.

SUMMARY OF THE INVENTION

The present invention, therefore, provides apparatus for the automatic transfer of individual packs of signatures from a storage station to at least one treatment station, characterised in that it comprises a rigid frame defining a bridge crane including at least one pair of parallel fixed guide rails and a pair of parallel movable rails extending perpendicularly with respect to the fixed rails and displaceable along them, the said movable rails supporting a transfer head assembly for the said packs of signatures, including a jaw assembly having jaws which are relatively movable towards or away from one another respectively to grip or release a pack of signatures, motor means being provided for effecting bi-directional translation of the said transfer head assembly along the said movable rails, for bi-directional translation of the said movable rails along the said fixed rails, for vertically raising and lowering the jaw assembly with respect to the transfer head assembly, and for effecting relative approach and separation of the said jaws, the said motor means being controlled by automatic control means operatively connected thereto.

Other features and advantages of the present invention will become more apparent from the following detailed description, in which reference is made to the appended drawings, which illustrate several different specific embodiments of the invention, and which are provided purely by way of non-limitative example only.

DESCRIPTION OF THE PREFERRED EMBODIMENTS

Figure 1:
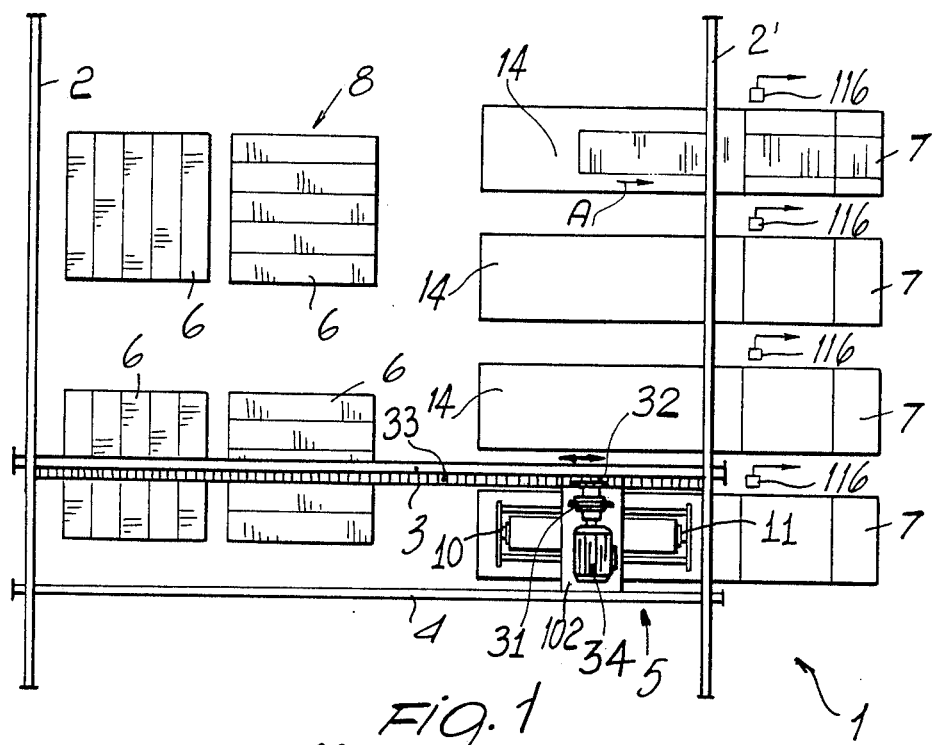
FIG. 1 is a plan view from above of one embodiment of the apparatus of the present invention.
Figure 2:
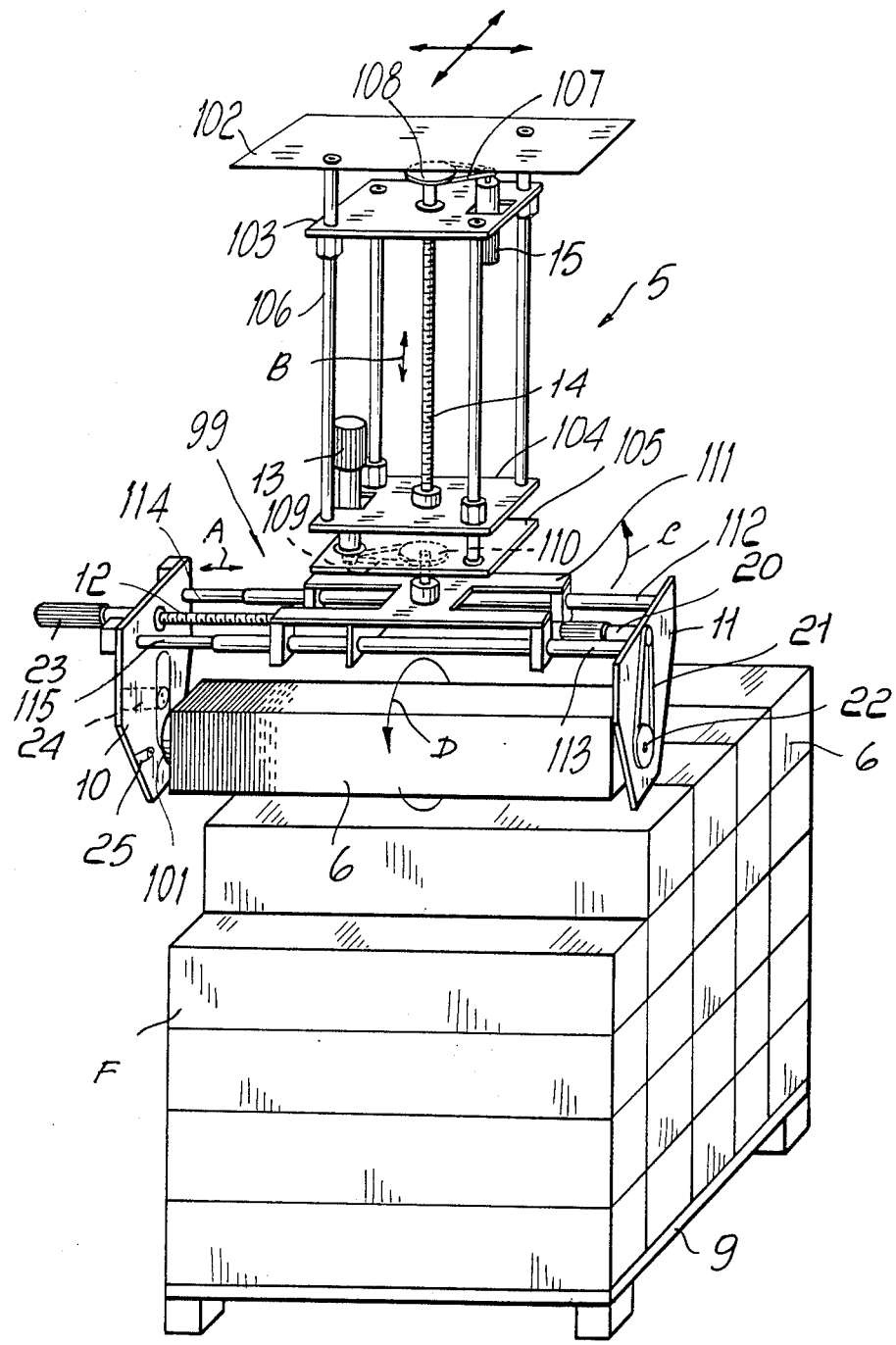
FIG. 2 is a perspective view of a signature pack transfer head forming part of the apparatus shown in FIG. 1.

Making reference now to the drawings, and in particular to FIGS. 1 and 2, there are shown respectively therein a plan view from above and a partial perspective view of apparatus for the automatic transfer of individual packs 6 of signatures from a storage station 8, where the packs of signatures are stored on pallets, to at least one working station 7 of which four are shown in FIG. 1. It must be borne in mind that the apparatus illustrated in FIGS. 1 and 2 has been shown only in a rather schematic manner, and that many of the mechanical components thereof needed for the transfer of movements have for clarity not been shown. These components are, however, no more than conventional components which those skilled in the art will appreciate can be derived from what has been shown using only common mechanical knowledge.

More specifically, making reference to FIG. 1, the apparatus according to the invention shown therein has been generally indicated by the reference 1. It comprises a rigid frame carried by a base (not shown). The rigid frame substantially defines a bridge crane including a pair of parallel fixed guide rails 2, 2' supported at a certain level above the floor, and a further pair of movable rails 3, 4 extending substantially perpendicularly to the fixed rails 2, 2' and able to translate substantially horizontally in the two opposite directions along the rails 2, 2' driven by a motor which has not been shown.

Carried on the movable rails 3,4 is a transfer head assembly 5 which is provided with a geared motor 34 which, via an electromagnetic or pneumatic clutch 31, can be connected to or disconnected from a sprocket 32 which engages a rack 33 running parallel to the movable rails 3,4 for translation of the transfer head assembly 5 along the rails 3,4. The transfer head assembly 5, which is shown better in the perspective view of FIG. 2, is able to translate in either direction along the rails 3,4 between a signature pack pick-up position and a position in which the individual packs 6 of signatures are transferred to a treatment station 7 which may be, for example, a wrapping station or alternatively may be a magazine or loader, or a sheet feeder, for transferring the signatures individually onward for further treatment.

The geared motor 34 of the transfer head assembly 5 is carried on a plate 102 which is slidably engaged (in a manner not shown) with the rails 3,4 for displacement there along. Suspended from the plate 102 is a mounting plate 103 carrying a motor 15 which drives a threaded lead screw 14 via a belt 107 and pulley 108. The motor 15 is carried on a subsidiary plate 103 suspended from the slide plate 102, and four telescopic guide rods 106 extend from the plate 103 to a movable plate 104 to which is connected a subsidiary plate 105. From the subsidiary plate 105 is suspended a jaw assembly 99 which, together with the plates 104 and 105, can be raised or lowered by operation of the motor 15 causing the screw 14 to turn in one direction or the other to effect extension or contraction of the telescopic guide rods 106 as represented by the double arrow B of FIG. 2. The jaw assembly 99 can be rotated as a whole about a vertical axis coincident with the screw 14 by means of a motor 13 carried on plate 105, which transmits motion to a belt 109 and pulley 110 to turn the jaw assembly in one direction or the other about a vertical axis as represented by the arrow C of FIG. 2.

The jaw assembly 99 comprises a cradle 111 suspended pivotally from the plate 105 and carries two parallel telescopic guide tubes 112,113 at one end of which is the jaw plate 11 and within the other end of which are slidably engaged corresponding guide rods 114,115 which at their free ends carry a second jaw plate 10 similar in shape to the jaw plate 11.

Extending between the jaw plate 10 and the support cradle 111 is a screw 12 turnable with respect to the jaw plate 10 by a motor 23 to cause the jaw plate 10 to move away from or towards the cradle 111 and consequently the opposite jaw plate 11 in dependence on the direction of rotation of the motor 23.

Each of the jaw plates 10,11 carries a pivoted buffer plate 101 (only one of which, namely that on the jaw plate 10, is visible in FIG. 2). The buffer pad 101 on the jaw plate 10 is freely rotatable, whilst the buffer pad 101 on the jaw plate 11 is turnable under the control of a motor 20 drive from which is transmitted via a belt 21 and a pulley 22 to the buffer pad 101 of the jaw plate 11. Rotation of the drive motor 23 thus causes relative separation or approach of the jaw plates 10 and 11, as represented by the double arrow A of FIG. 2, to grip or release a pack 6 of signatures respectively and, when in the relatively approached position gripping a pack of signatures 6 as illustrated in FIG. 2, the pack 6 can be rotated about its longitudinal horizontal axis, as represented by the arrow D in FIG. 2, by rotation of the motor 20.

The apparatus of the invention is provided with a detection system 116 for detecting the presence of the signatures of a pack 6 at each treatment station 7, which system gives the signal for loading of the station when the pack 6 of signatures is sufficiently depleted by the operation of the treatment station. The detection system 116 functions in this way: when the pack 6, gradually as it is worked by the treatment station, has advanced to a certain point, the detection system 116 is triggered to produce a signal indicating the absence of a pack 6 at the treatment station 7 in question, making the transfer head assembly 5 leave for the transfer of a new pack 6 to this treatment station 7, or booking it for this purpose if it is already in operation loading another of the treatment stations 7. The detection system 116 may comprise for example, a photocell, an end stop microswitch actuated either through suitable levers or directly, a capacitive switch, a system for counting the sheets as they are treated at the treament station 7, a sheet feeder (not shown) to which the treatment station 7 may be linked, or a counter which counts the number of times or the sum of the number of times that the treatment station 7 is actuated to supply such a sheet feeder (not shown), or by any other system provided for the same purpose.

The initiation of the movement of the transfer head 5 may also be controlled by a keyboard or other form of control means, by which the operator may identify an empty treatment station 7 with a suitable code or other operation, to cause the transfer head assembly 5 to set off to perform a cycle of operations to supply the empty treatment station 7. The examples of sensors for controlling the commencement of operation of the movable transfer head are described and illustrated here purely by way of example and are not to be considered as limitative. When a sensor 116 located at a treatment station 7 issues a signal indicating that the pack of signatures at that station,is becoming depleted and in need of replacement, this signal is passed to a microprocessor, to identify the treatment station which must be supplied with a new pack of signatures. The movable transfer head 5 is then controlled to move to the pallet containing signatures of the type on which the treatment station 7 in question is operating, which has fixed references for its location.

Once it has arrived at the appropriate position over the first pack of the top row of packs, a position identified by an end stop microswitch or by means of a position encoder the operation of which will be described in more detail below, the jaw assembly 99 is lowered until a signal is generated by a photocell 24 (FIG. 2) to indicate that the jaw plates 10,11 of the jaw assembly 99 have arrived at the correct height with the transfer head assembly 5 positioned over the stack of packs 6, which position may alternatively be given by an encoder. Then the transfer head assembly 5 is moved horizontally to centre the jaws 10,11 in the horizontal sense. Arrival at this position is indicated by a signal from a photocell 25 on the jaw plate 10 (FIG. 2) or alternatively (in other embodiments) by an encoder. At this point the drive connection between transfer head 5 and the rails 3,4 is released by means of the electromagnetic clutch 31, and closure of the jaws 10,11 onto the pack 6 commences; by releasing the clutch 31 during this closure of the jaws the transfer head 5 is able to centre itself on the pack 6 as the jaws 10,11 close, bearing in mind that only the jaw plate 10 moves in the direction of the arrow A of FIG. 2, with respect to the cradle 111, the other jaw plate 11 being fixed in relation to the cradle 111.

Once the pack 6 is gripped by the transfer head 5 this latter is raised and then moved to the treatment station 7 from which the pack call signal originated, moving along the rails 3,4 under the control of the electric drive motor 34 and along rails 2,2' under the control of another drive motor (not shown).

Upon arrival in position over the treatment station 7 a position given by an end stop microswitch or an encoder, the transfer head 5, before commencing to descend, causes the pack 6 to rotate about its longitudinal horizontal axis in the sense of the arrow D and the gripper head as a whole is turned about a vertical axis in direction of the arrow C (if necessary) to align the pack 6 with the bed of the treatment station 7. This done, the transfer head 5 is released from the rails 2 and 2' by means of the clutch 31 and the descent is commenced, self-centering of the pack 6 between the sides of the magazine taking place automatically, for example, by engagement of cooperating parts. The transfer head 5 is stopped in the correct position on the treatment station by an end stop microswitch positioned on the transfer head 5 or on the bed of the treatment station, or else by a signal coming from an encoder as will be described in more detail below.

Once the transfer head 5 has stopped on the bed of the treatment station 7 the movable jaws 10.11 move apart releasing the pack 6. The transfer head 5 is then free to commence a new cycle for loading another treatment station 7.

In FIG. 1 the storage region for the packs of signatures has been generally indicated by the reference 8 and, as can be seen in FIG. 1, the packs 6 of signatures are stacked in a plurality of different groups orientated in different ways, and, in particular, with the packs of signatures disposed along the length of the rails 3,4 as in the two front stacks, and transversely of the rails 3,4 as in the two rear stacks. In FIG. 2 there is shown an individual stack F of packs 6 of signatures stacked on a pallet 9, the individual packs 6 being orientated transversely, with their major longitudinal dimension substantially horizontal as in the front two stacks of packs shown in FIG. 1. In use, therefore, the transfer head assembly 5 can translate forwardly and backwardly along the rails 3 and 4 to carry each individual pack of signatures from the storage region 8 to each individual treatment station 7; their displacement from the storage station to the treatment station 7 is effected simply by substantially horizontal translation of the transfer head 5 along the rails 3,4 and of these latter along the fixed rails 2 and 2' (with necessary vertical displacement for lifting and lowering at each end of the movement as necessary).

As mentioned above, not all of the motors which make these movements have been specifically illustrated, for simplicity, and from now on it must be borne in mind that these motors form part of a motor system, for example a d.c. system, which can be controlled, according to the invention by means of a single microprocessor circuit.

With particular reference now to FIGS. 11 to 16, the second embodiment includes a transfer head assembly 5 having a telescopic column 50 which has a polygonal cross-section and is fixed to a horizontal upper plate 51 carried by the rails 3,4 in such a way as to be slidable along these rails as described above.

Within the column 50 there is a telescopically slidable inner member 52 of corresponding cross-section, which is connected to a chain 53 passing over upper and lower toothed pulleys 54 and wound on a winch 55 by means of which the chain 53 can be displaced for causing the inner member 52 to be raised or lowered. The inner member 52 supports a lower horizontal plate 56 connected via a thrust coupling to a second horizontal plate 57 provided with downwardly facing vertical projections 58 which carry fixed horizontal tubular guides 59 at one end of which is fixed a first downwardly extending jaw 60.

The guides 59 carry within them slidable cylindrical support elements for a second movable jaw 61 which is displaceable towards or away from the said first jaw 60 by the contraction or extension of a rod 62 of a double acting fluid pressure actuator cylinder 63.

The jaws 60 and 61, on their faces directed towards one another, support disc-like buffer pads, respectively 64 and 65, rotatable about a common horizontal axis. The buffer pad 65 on the jaw 61 is mounted on a spindle (not shown) on which is keyed a pinion 66 (FIG. 16) which is driven to rotate by a toothed belt 67 driven by a pinion 68 rigidly connected to the shaft of a geared motor 69; the buffer pad 64 on the jaw 60 is preferably freely rotatably mounted.

The plate 57 further supports a double-acting fluid pressure actuator 70 the actuating rod of which is connected to the plate 56 to turn the jaw assembly 100 about its vertical axis upon extension or contraction thereof.

The transfer head assembly 5 is capable of being controlled to grip a pack 6 of signatures, raise it, rotate it about its longitudinal (horizontal) axis and turn it about a vertical axis transverse its length, displace it to a desired position and release it there. These operations can be effected manually by acting on a keyboard 71 supported by arms 72 projecting from the column 50, or may be controlled through a suitably programmed microprocessor system. Various embodiments of such a system are described hereinbelow with reference to FIGS. 3 to 9.

In particular, the present invention resolves the problem of the precise control of the displacement of mechanical members for the engagement and transfer of individual packs 6 of signatures by using a microprocessor to control the simultaneous positioning of various fluid pressure actuators as well as the drive to a number of individual motors, whilst at the same time effecting control of other functions possibly required by the specific treatment process to be, performed on the signatures either in transit or at the treatment stations 7. In an extremely simple embodiment the control can largely be effected by means of end stops or microswitches, (not shown) which can be positioned at suitable points to control energisation of drive motors. In this case the microprocessor only has to initiate a movement and to continue it whilst monitoring the arrival of an end-of-stroke signal from a microswitch, which upon arrival, causes the movement to be stopped. This can be effected, for example, via a relay or the like (not shown).

Figure 3:
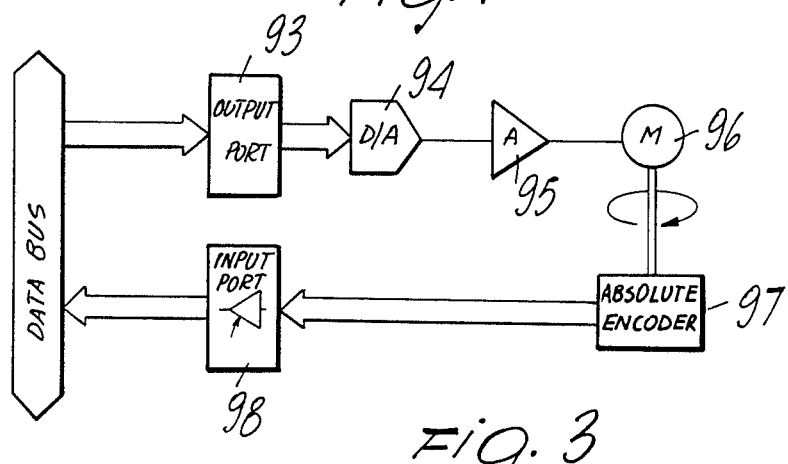
FIG. 3 is a general arrangement diagram showing some of the components of a position control loop for one of the movable parts of the transfer head of FIG. 2.

Other embodiments for very much more precise control of positioning and transfer, utilising closed loop servo systems with position-sensing transducers are, however, envisaged. In particular, several embodiments will be considered using electric motors and d.c. actuation with absolute or incremental digital transducers. One such embodiment is shown in FIG. 3 in which the position of a member displaced by a motor 96 (which may, in fact, be any of the motors of the transfer head assembly 5 mentioned above) is detected by an absolute encoder 97 which sends signals to the CPU through an input port 98. The CPU processes the data in a manner which will be described below and issues control signals through an output port 93 to a digital-to-analogue converter 94 which, via an amplifier 95 controls the energisation of the motor 96.

As is known, absolute encoders provide a signal corresponding uniquely to the position of the member in motion. Such transducers are utilised where it is important to have a measurement of the position which is absolutely unaffected by disturbances and is not lost in the case of mains failure. This is the case in the apparatus in question which must transfer each individual pack of signatures without fail.

Figure 4:
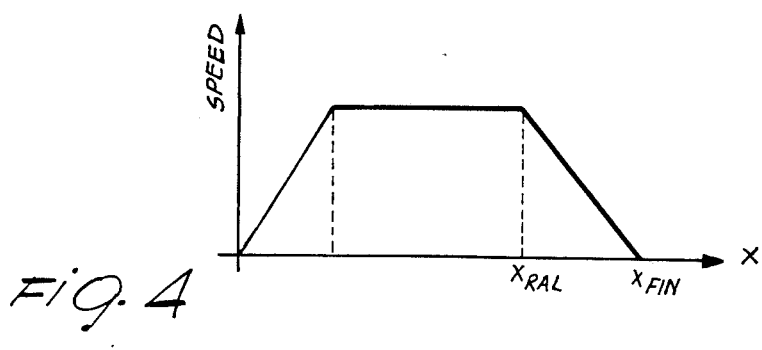
FIG. 4 is a velocity-displacement diagram illustrating the movement of a signature pack transfer head of the apparatus of the invention.
Figure 5:
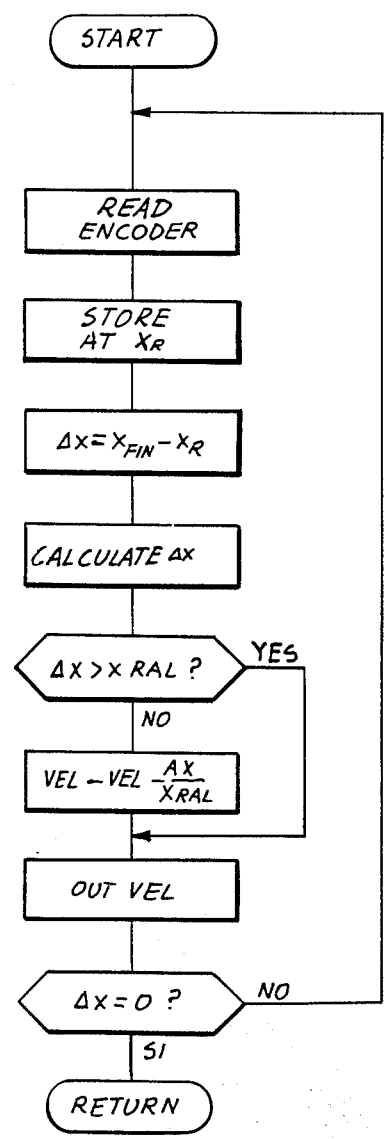
FIG. 5 is a flow diagram representing a possible routine for controlling the positioning of a transfer head with a system including an absolute encoder.

As a positioning model there has been chosen one having a velocity variation as shown in FIG. 4. With this model the motors effecting displacement of any of the components must receive a voltage proportional to the programmed speed for its displacement. Such voltage may be supplied by the digital-to-analogue converter 94 controlled by digital signals from the output of the microprocessor. A system of this type constitutes an open loop servo. At a certain distance from arrival of the component at the required position, for example at the required height in the case of the motor driving the winch 55 to control the height of the transfer head 5, that is to say at a height $X_{ral}$, the loop is closed and the motor is sent a signal proportional to the position error, that is to say the "displacement required" to arrive at the desired height. Thus the motor slows. In FIG. 5 there is shown a routine which allows the sequence described to be obtained.

The RAM of the microprocessor has various addresses at which are stored units of information as follows:

$X_R$—real position: which contains the position measured at any instant by an encoder;

$X_{fin}$—final position: which contains the value of X, the final displacement point; this memory address is loaded during loading of the main programme of which the routine under examination here forms part;

$X_{ral}$—slowing position: which contains the distance from the final displacement point at which slowing must be initiated; this value is determined by the main programme and in general is proportional to the required speed of displacement;

VEL—programmed velocity: this is also determined by the main programme;

$\Delta X$—distance still to be travelled to arrive at the end of the required displacement: this represents the difference at any instant between $X_{fin}$ and $X_R$.

These memory addresses may contain two or three bytes according to the magnitude of the displacements to be managed and the working resolution. For example, with two bytes one can control:

a displacement of ±32 centimeters, with resolution of a tenth of a centimeter;

a rotation of up to 10 revolutions with a resolution of 3 minutes.

As far as the velocity is concerned, the value, VEL, which must be specifically chosen as a function of the magnitude of the specified displacement, is sent directly to the input of the digital-to-analogue converter 96 the output from which controls the motors in question; VEL is therefore, constituted by a number of bits equal to the capacity of the DAC 96. Normally an 8 to 12 bit converter can be used; of course the greater the number of bits the finer the resolution and more continuous the voltage output from the digital-to-analogue converter during slowing. As shown in FIG. 5, the position management routine starts with a reading of the encoder; the value read is stored at address $X_R$. Then the value $\Delta X$ is calculated as $$\Delta X = X_{fin} - X_R$$

$\Delta X$ can be positive or negative depending on the direction of arrival; therefore its absolute value is calculated.

If the movable number is not in the slowing region, that is if $\Delta X$ is greater than $X_{ral}$ the routine causes the stored contents of VEL to continue to be sent to the DAC 94, which is still the original value corresponding to the desired velocity. When the slowing region is reached, on the other hand, the value of VEL is varied according to the formula:

$$VEL = (VEL \times \Delta X)/X_{ral}$$

The new value of the velocity is sent to the DAC 94. This routine is continually repeated, each time updating the output of the DAC 94, until the final position is reached, when $\Delta X = 0$.

Figure 6:
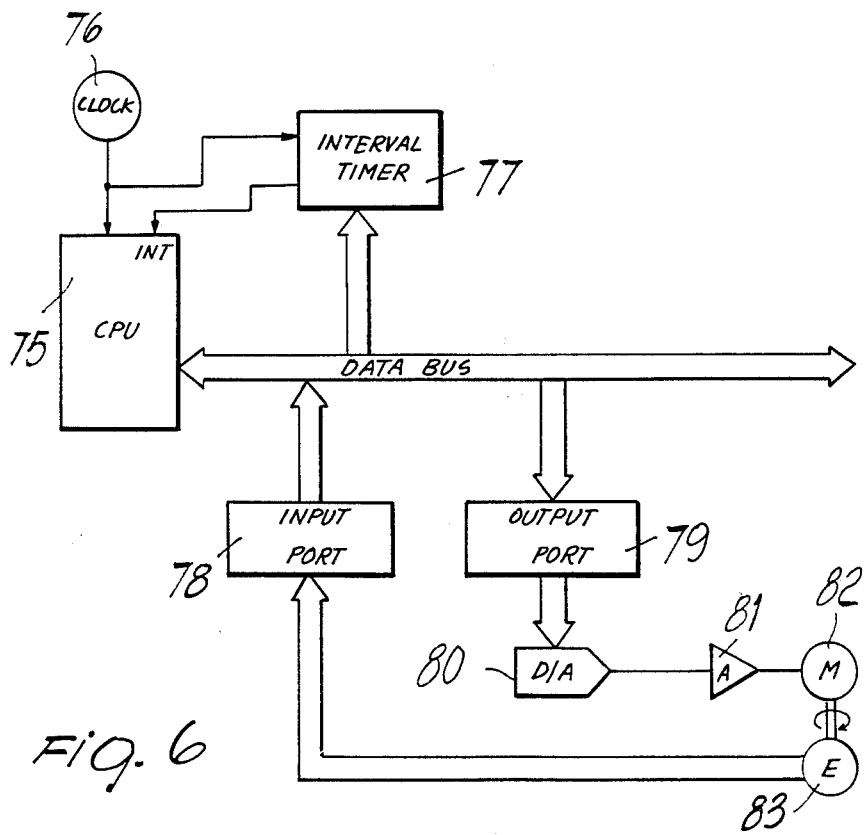
FIG. 6 is another block schematic diagram illustrating a further embodiment of a system for the continuous control of the position of one of the movable members of the transfer head assembly using a microprocessor.

FIG. 6 is a block diagram illustrating a variant of greater precision, which is based on the principle of considering, as comparison value, not the final position, but a value $X_T$ or theoretical position, which is continuously incremented at a frequency F. The system constrains the real position $X_R$ to follow this theoretical position with a velocity equal to F, for resolution of the movement.

The system shown in FIG. 6 includes an interval timer 77 for generating a frequency signal F which is used as an interrupt of a CPU 75. The interval timer 77 is a commercially available circuit in integrated form and directly compatible with the microprocessor used; it permits the microprocessor software to be simplified for real time operation. The CPU is operated at a clock frequency determined by a clock 76 and communicates data via input and output ports 78,79 respectively. The output port supplies a digital-to-analogue converter 80 which, via an amplifier 81 controls a motor 82 driving the movable member (not shown) of the transfer head assembly 5. The movement of this member is detected by an encoder 83 which sends signals via the input port 78 to the CPU 75.

The CPU presets in the timer 77 a certain value N. This value is decremented automatically at the clock frequency; in this case the same clock 76 as in the CPU. When zero is reached the timer 77 sends an interrupt signal to the CPU 75 and resets the value N automatically.

The frequency at which the interrupt is sent to the CPU is:

$$F = 1/(N \times T)$$

where T is the clock period.

For example, to obtain a displacement at a speed of 0.6 m/min and a resolution of 100th (i.e. 1 cm), it is necessary to provide a frequency of 1 KHz—(1,000 hundredths of a meter per second)—the value N to be preset on the interval timer is, therefore:

$$N = (3 \times 10^6)/1000 = 3,000$$

assuming the CPU employs a clock frequency of 3 MHz.

Naturally, the microprocessor effectively performs the entire interrupt routine in a time reasonably less than 1/F.

Figure 7:
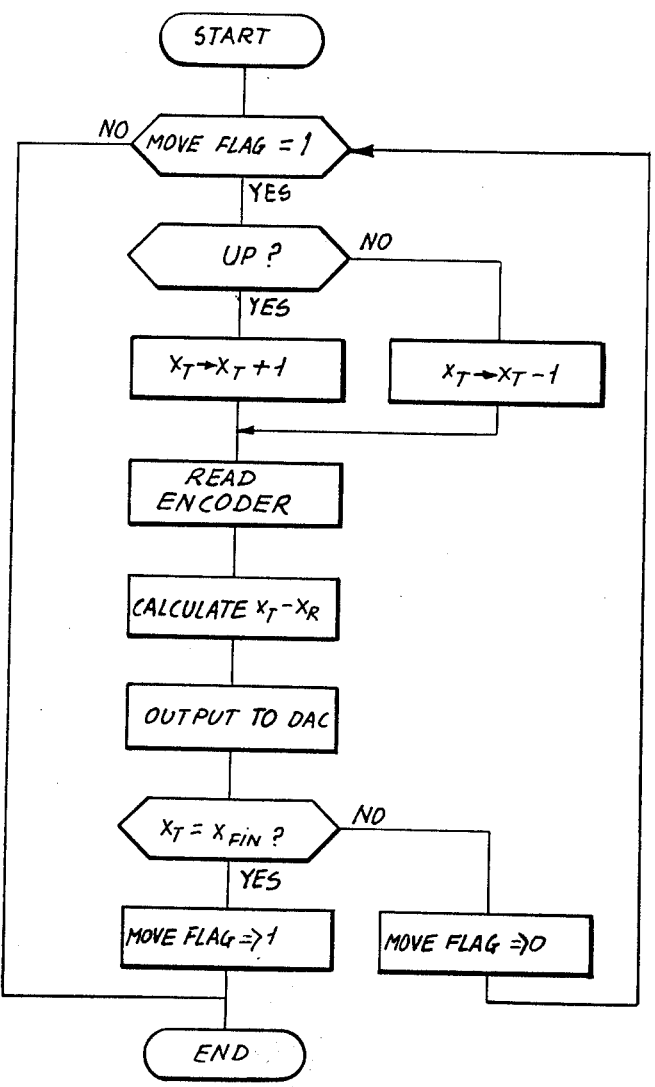
FIG. 7 is a flow diagram of a possible interrupt routine for control system represented in FIG. 6.

FIG. 7 shows an interrupt routine for the position management of individual packs of signatures. The object of this routine is to cause the position to increment by an amount equal to the resolution. A "move" indicator or flag, constituted for example by a particular bit in a memory cell, allows the main programme to communicate to the routine the existence or otherwise of a displacement request. If the move indicator flag is zero the routine is limited to checking the maintenance of the position by correcting possible errors. If, on the other hand, the move indicator flag is at 1, a theoretical position counter $X_T$ is incremented or decremented according to the direction of movement (e.g. upward or downward).

$X_T$ represents the position at which the controlled member must be found when the position loop error should become zero. This position is, in fact, followed by the control mechanism. The real position $X_R$ is detected by reading the encoder 83; the difference between $X_R$ and $X_T$, which constitutes the loop error is then sent to the DAC 80 to control the motor 82. Once it has been verified that the final position $X_{fin}$ has been reached, at least theoretically, the move indicator flag is zeroed.

This routine is repeated each time that the interrupt is reached; therefore, even after having arrived at the required position, the DAC 80 continues to provide an updating signal proportional to the loop error. The system is thus always under active control even when it must remain stationary.

Figure 8:
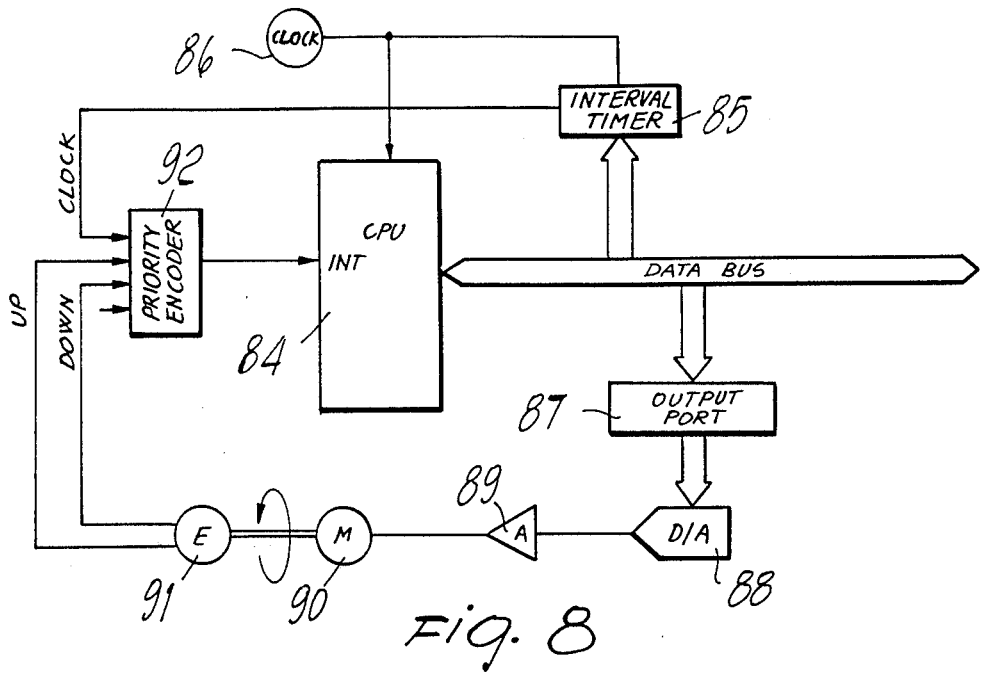
FIG. 8 is a block schematic diagram of a microprocessor control system for controlling the movement of one of the movable members of the transfer head assembly using an incremental encoder.

In FIG. 8 there is shown a block diagram of another embodiment of the control system associated with the apparatus forming the subject of the invention, in which the microprocessor determines the position using an incremental optical encoder 91 which allows high precision at a reasonable cost. As is known, an incremental optical encoder is constituted by a transparent disc on which are marked notches. These notches are read by a phototransistor illuminated by an LED or by a lamp. When the encoder disc is rotated the phototransistor generates a number of pulses the frequency of which is proportional to the speed of rotation. It must be borne in mind that it is necessary to know with precision the initial position either of the initial pack of signatures or of the movable members which serves as a reference, and starting from which the displacement required to move to the required absolute position are measured. In fact, upon starting the measurement system, the absolute position is unknown, not knowing for certain in which position the incremental transducer 91 is located with respect to the reference point; it is thus necessary to perform a setting movement, that is to say to pass through the reference point and zero the measurement system there. The encoder used is one having recognition logic for recognising the direction of movement, able to provide a sequence of pulses on one of two lines UP or DOWN, according to the sense of rotation as shown in FIG. 8. The signals on these two lines are sent, by means of a priority encoder 92, to the interrupt input of a CPU 84; a further interrupt line leads from an interval timer 85 which here too provides a reference frequency proportional to velocity; both the interval timer 85 and the CPU 84 are timed by the same clock 86. Data signals from the CPU data bus are fed out via an output port 87 to a digital-to-analogue converter 88 which, via an amplifier 89 controls energisation of a motor 90 to cause displacement of the movable member (not shown) the position of which is measured by the encoder 91.

Figure 9:
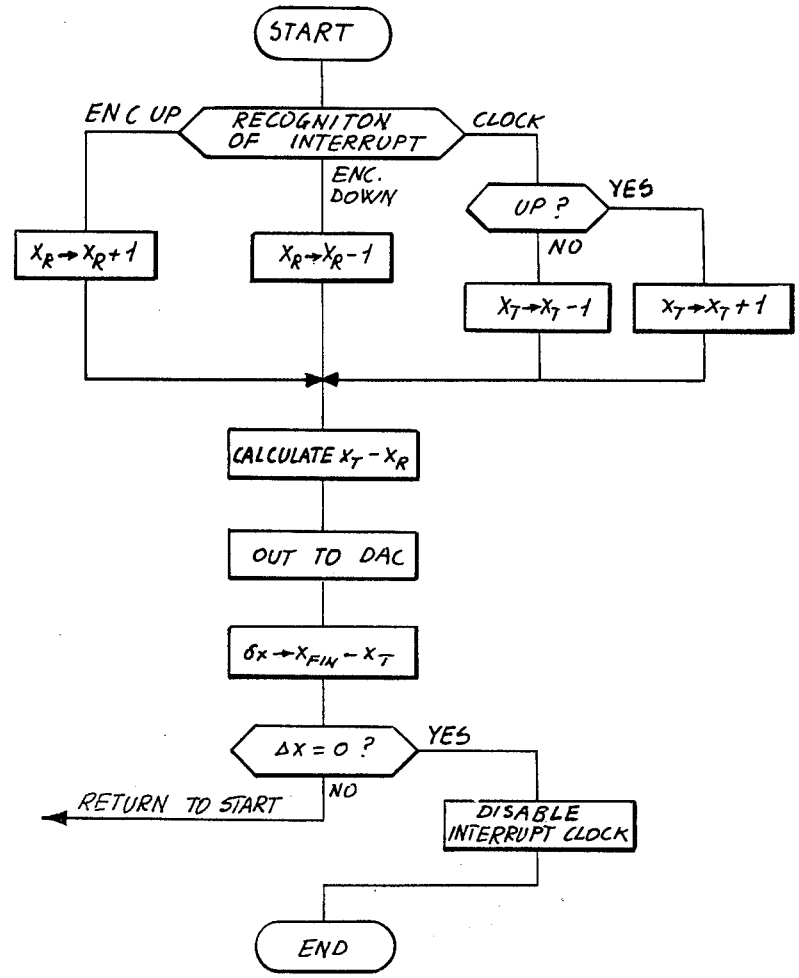
FIG. 9 is a flow diagram of a possible interrupt routine for system shown in FIG. 8.
Figure 10:
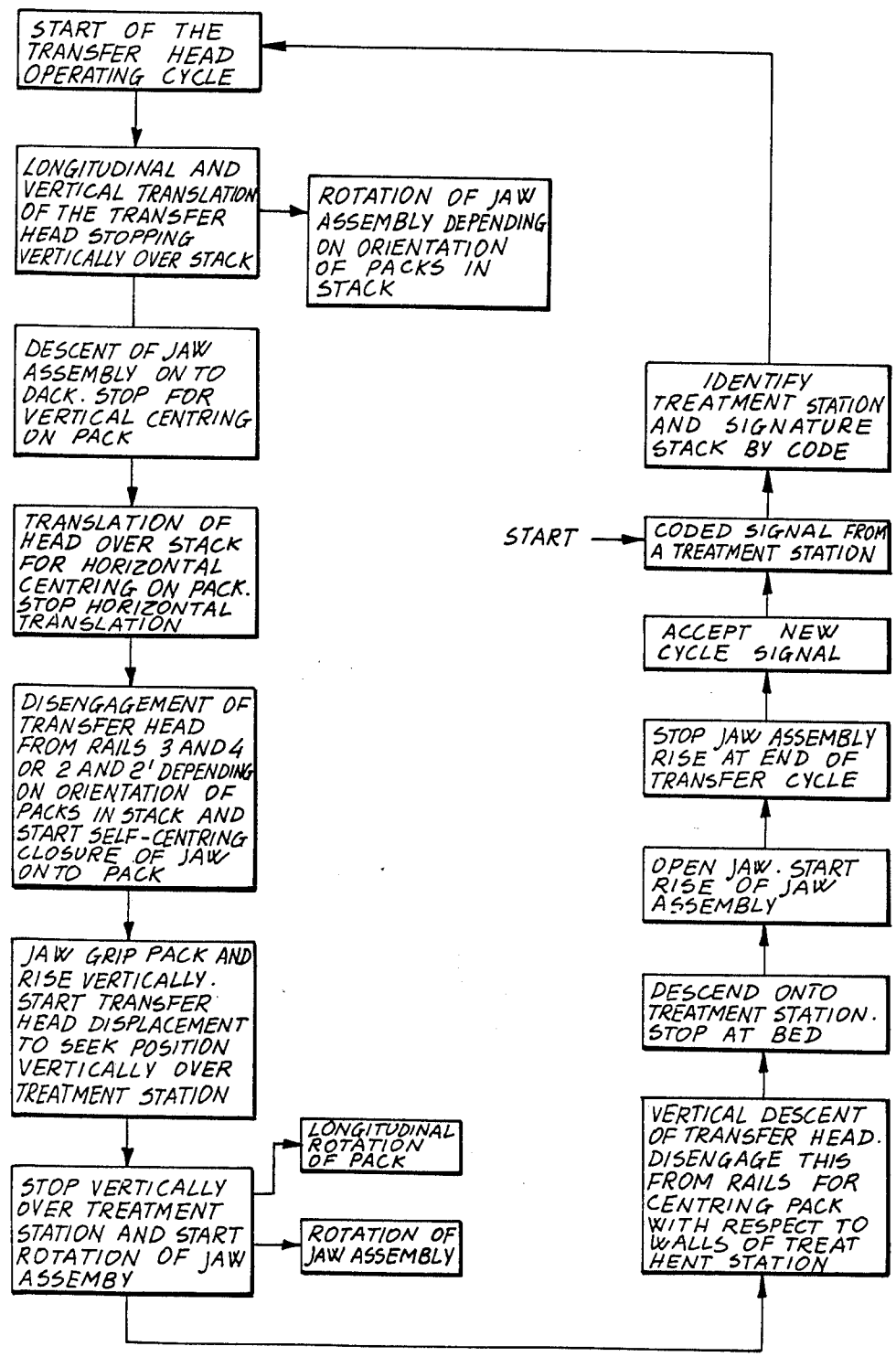
FIG. 10 is a flow chart illustrating the overall operation of apparatus of the invention.
Figure 11:
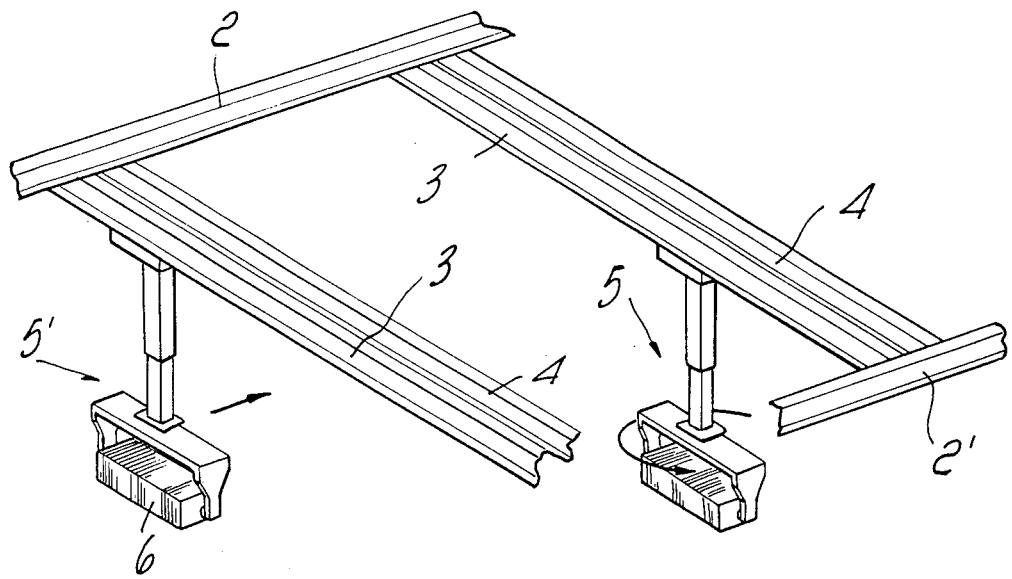
FIG. 11 is a perspective view of a part of the bridge crane on which a plurality of transfer heads are movable.
Figure 12:
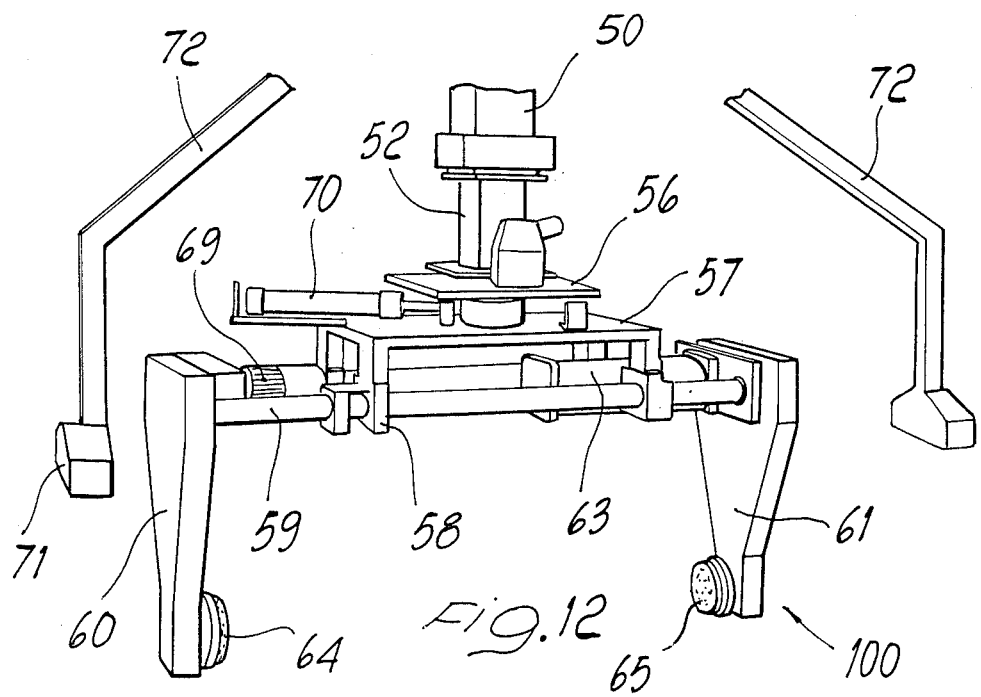
FIG. 12 is a perspective view of the lower part of a transfer head, in particular the jaw assembly.
Figure 13:
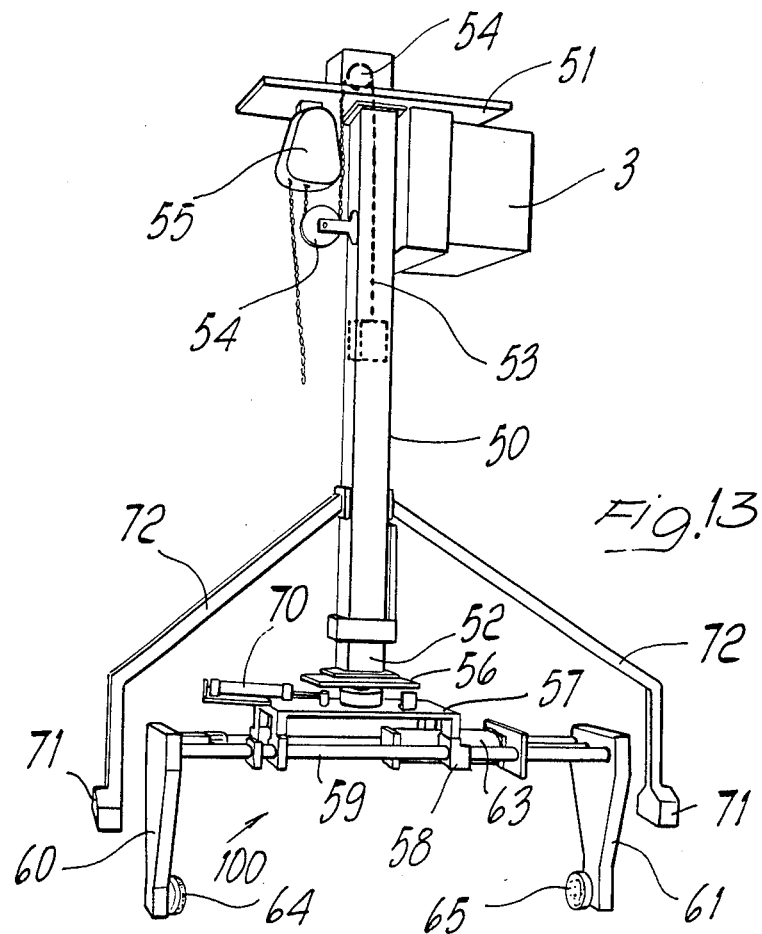
FIG. 13. is a perspective view showing the general assembly of a transfer head as a whole.
Figure 14:
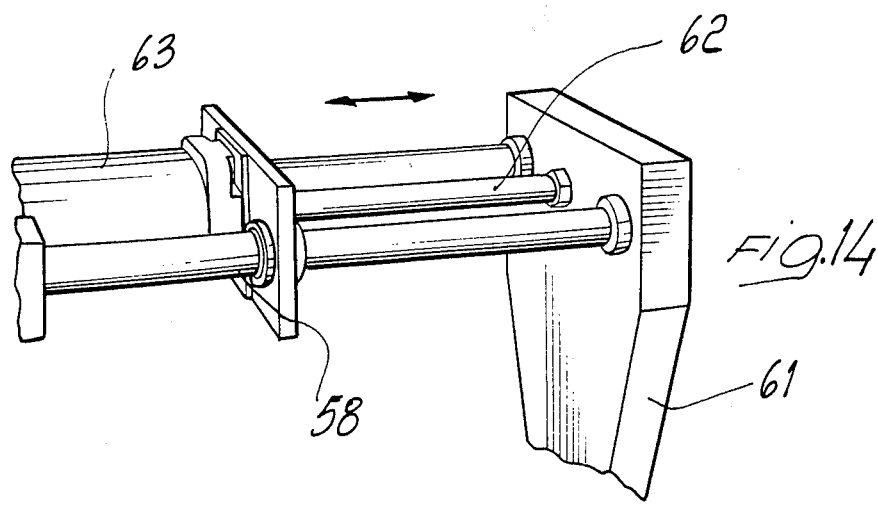
FIG. 14. is a partial perspective view, on an enlarged scale, showing one jaw of the jaw assembly.
Figure 15:
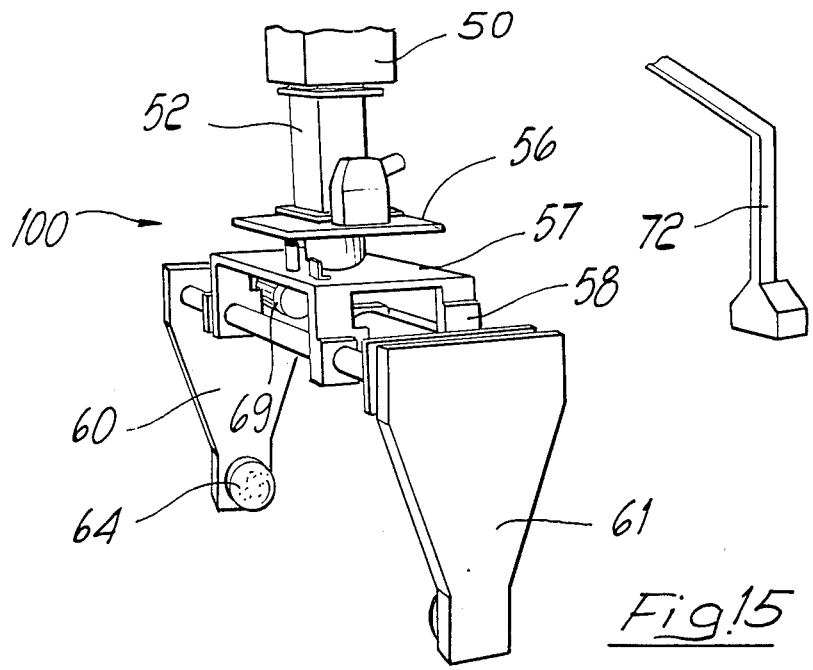
FIG. 15 is a perspective view of the jaw assembly frame of a transfer head.
Figure 16:
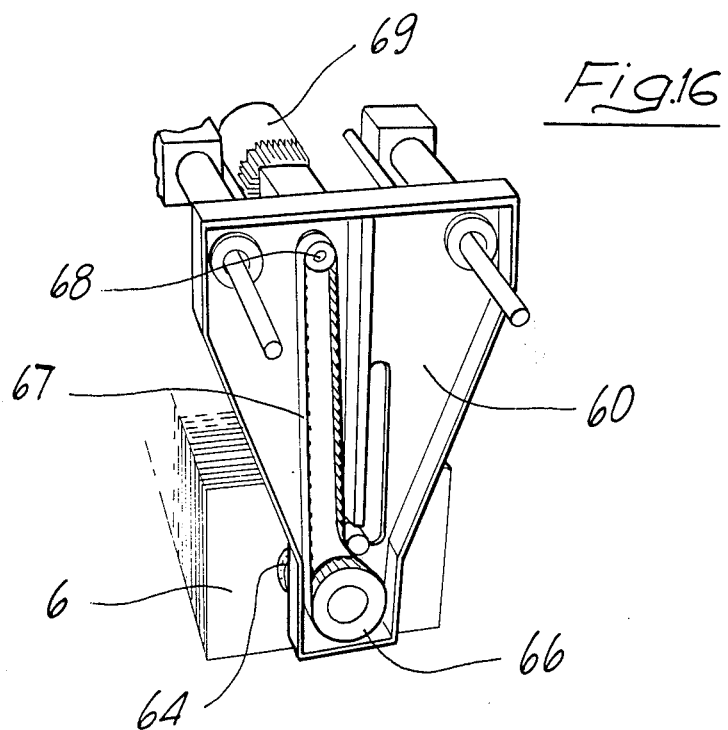
FIG. 16 is a perspective view, on an enlarged scale, of one jaw of the jaw assembly, showing the means for rotation of a jaw buffer pad.

The interrupt management routine is shown in FIG. 9. The main programme prepares the value of the desired final position and an indicator which indicates the direction of displacement—UP or DOWN (this will be understood, in relation to horizontal displacement, to be equivalent to operations in one directional sense or the other).

In this embodiment also there are provided memory addresses—$X_R$ and $X_T$—which store the value of the instantaneous or real position and that of the theoretical height respectively. The first step in this routine is recognition of the interrupt; when this occurs $X_T$ or $X_R$ is updated according to the event which has caused the interrupt. A new value of the target error is then calculated and the result is sent to the DAC.

Whenever a routine has been performed the value of $\Delta X$, that is the difference between the final position and the current theoretical position is examined. When $\Delta X = 0$ the interval timer interrupt is disabled, whilst the other two remain enabled. In this way, the theoretical position counter no longer varies but the system is constrained to maintain the desired position: possible displacements are, in fact, converted into encoder pulses which cause interrupts; these interrupts, which still remain enabled, are managed in the usual way causing intervention of the DAC to effect the necessary corrections.

Naturally, the microprocessor software will depend on the specific movements, in particular on the linear or angular distances which must be covered, as well as the specific types of signature packs. It is possible easily to adapt the previously described embodiments to a flexible system able to handle the most varied forms of signature packs.

The present invention thus provides apparatus for the automatic transfer of individual packs of signatures from a storage station, where they are stored on pallets, to a plurality of working stations, in which the recognition of the position of the packs of signatures, and their transfer to a desired destination, is directly managed by a microprocessor which guarantees absolute operating reliability.

What is claimed is:

1. Apparatus for the automatic transfer of individual packs of signatures from at least one stack thereof to at least one treatment station, comprising:

a rigid frame defining a bridge crane having at least one pair of substantially horizontal parallel fixed guide rails, at least one pair of substantially horizontal parallel movable guide rails extending perpendicularly with respect to said fixed guide rails and slidably movable therealong, first drive means operating to cause displacement of said movable guide rails along said fixed guide rails, a transfer head assembly mounted on said movable guide rails for longitudinal displacement therealong, second drive means operating to cause displacement of said transfer head assembly along said movable guide rails, a jaw assembly including a fixed jaw and a movable jaw, mounted on said transfer head assembly and vertically displaceable with respect thereto, third drive means operating to raise and lower said jaw assembly with respect to said transfer head assembly, fourth drive means operating to rotate said jaw assembly about a substantially vertical axis with respect to said transfer head assembly, fifth drive means operating to cause said movable jaw to move towards or away from said fixed jaw whereby to grip or release a pack of signatures between them, automatic electronic control means operating to control the energisation of said first, second, third, fourth and fifth drive means whereby to cause said apparatus to pick up a pack of signatures from said at least one stack, transfer said pack of signatures to said at least one treatment station and release said pack of signatures at said at least one treatment station before proceeding to perform new cycles of operation on a successive pack of signatures, wherein said fixed and movable jaws include pack contact means for engaging each said pack of signatures upon relative approach of said jaws, said pack contact means being rotatable about a horizontal axis and sixth drive means operating to cause said pack contact means to rotate about said horizontal axis thereof.

2. An apparatus according to claim 1, wherein said jaw assembly is provided with detector means for indicating the correct longitudinal position of said transfer head assembly along said movable rails whereby to align said pack contact means of said jaws with the longitudinal central axis of a pack of signatures.

3. An apparatus according to claim 1, wherein said transfer head assembly includes a telescopic column comprising an outer member of polygonal cross-section, an inner member of corresponding cross-section slidably housed within said outer member, means interconnecting said inner telescopic member and said jaw assembly, a chain connected to said inner member and a winch for winding said chain whereby to raise and lower said inner telescopic member and thus said jaw assembly.

4. An apparatus according to claim 3, wherein said jaw assembly includes a horizontal plate connected to the lower end of said inner member of said telescopic column, a second horizontal plate, rotary coupling means interconnecting said horizontal plate and said second horizontal plate, vertical projections on said second horizontal plate, said vertical projections supporting fixed tubular guides, said fixed jaw of said jaw assembly being mounted on said tubular guides, inner slidable cylindrical support elements within said tubular guides, said movable jaw of said jaw assembly being connected to said slidable support elements, and a double acting fluid pressure cylinder supported by said second plate being connected to said inner slidable support elements whereby to cause said relative approach and separation of said jaws of said jaw assembly.

5. An apparatus according to claim 4 wherein said second horizontal plate carries a double acting fluid pressure cylinder constituting said fourth drive means, means connecting the actuating arm of said fluid pressure cylinder to said first horizontal plate whereby to cause rotation of said jaw assembly about a substantially vertical axis when said cylinder is extended or retracted.

6. An apparatus according to claim 1 wherein said pack contact members are disc-like buffer pads rotatable about a substantially horizontal axis, at least one of said pads being mounted on a spindle which is keyed to a toothed wheel on which engages a toothed belt driven by a drive pinion driven by said sixth drive means whereby to cause said buffer pad to rotate about said horizontal axis.

* * * * *